(12) United States Patent
Haller et al.

(10) Patent No.: US 6,281,804 B1
(45) Date of Patent: Aug. 28, 2001

(54) DISPLAY ARRANGED IN A MOTOR VEHICLE

(75) Inventors: Uwe Haller, Eisingen; Harald Leschke, Sindelfingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/939,441

(22) Filed: Sep. 29, 1997

(30) Foreign Application Priority Data

Sep. 27, 1996 (DE) ................................................ 196 39 673

(51) Int. Cl.⁷ ....................................................... G08G 1/00
(52) U.S. Cl. ........................ 340/901; 348/148; 348/149; 348/151
(58) Field of Search ............................. 340/901; 348/148, 348/149, 151

(56) References Cited

U.S. PATENT DOCUMENTS

| | | |
|---|---|---|
| 5,243,417 | 9/1993 | Pollard . |
| 5,289,321 * | 2/1994 | Secor ................................... 359/896 |
| 5,570,127 * | 10/1996 | Schmidt ............................. 348/148 |
| 5,574,443 * | 11/1996 | Hsieh .................................... 340/901 |
| 5,940,120 * | 8/1999 | Frankhouse et al. .................. 348/61 |

FOREIGN PATENT DOCUMENTS

| | | |
|---|---|---|
| 12 46 443 | 8/1967 | (DE) . |
| 71 02 936.2 | 8/1971 | (DE) . |
| 32 00 294 | 7/1983 | (DE) . |
| G9306989 | 8/1993 | (DE) . |
| 4317136 | 11/1993 | (DE) . |
| 42 38 275 | 4/1995 | (DE) . |
| 29612536 | 10/1996 | (DE) . |
| 6-262981 | 9/1994 | (JP) . |
| WO 96/21581 * | 7/1996 | (KR) . |
| WO 96/21581 | 7/1996 | (WO) . |
| WO 97/01246 | 1/1997 | (WO) . |

* cited by examiner

Primary Examiner—Julie Lieu
(74) Attorney, Agent, or Firm—Crowell & Moring, L.L.P.

(57) ABSTRACT

A display is described which is arranged in a motor vehicle in the area of the windshield. A sun visor will not be required when electrochromic glass is used in the case of the windshield. This also eliminates the make-up mirror. A camera is therefore integrated into the display such that an object photographed by the camera is shown on the display as a mirror image.

19 Claims, 1 Drawing Sheet

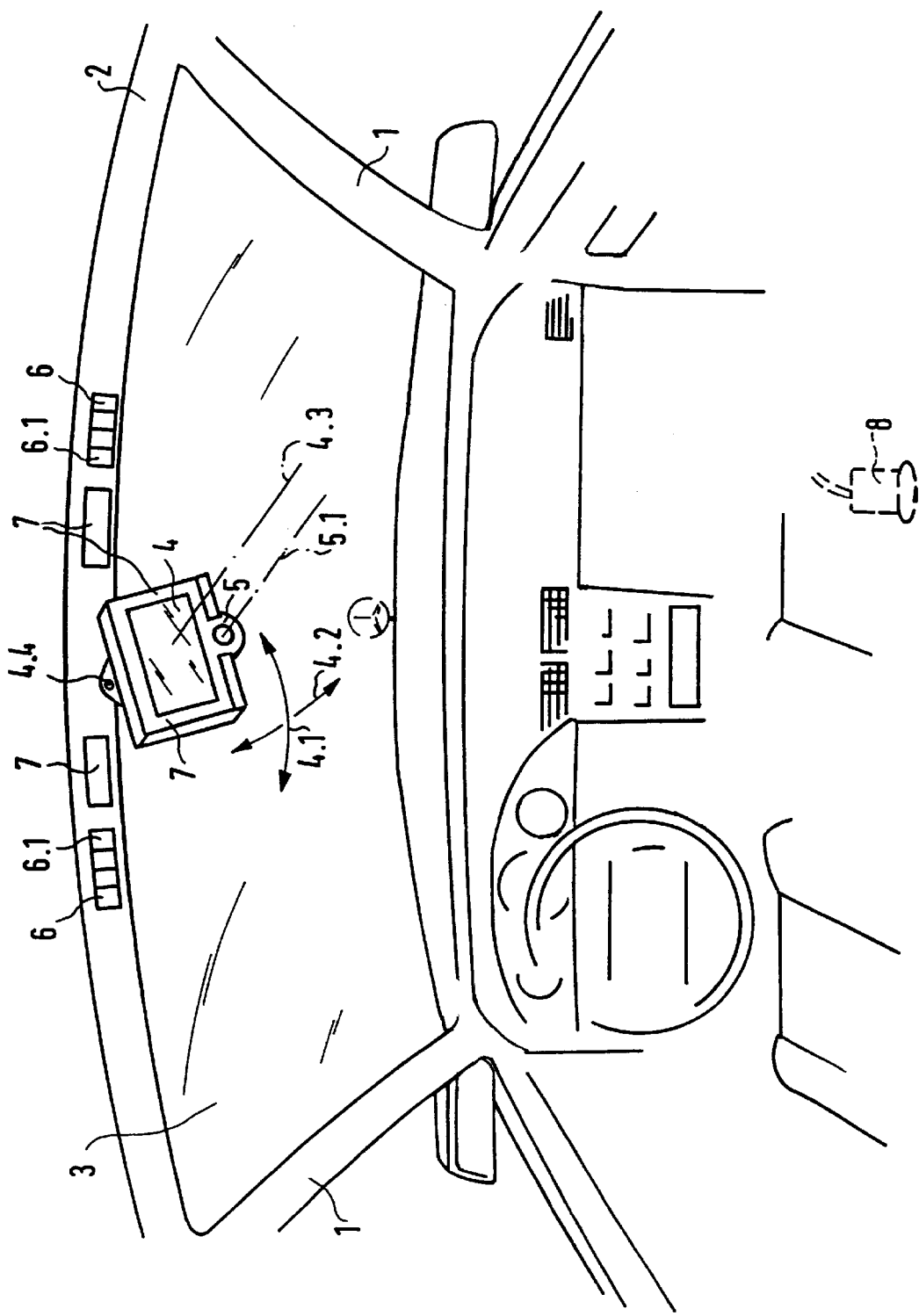

DISPLAY ARRANGED IN A MOTOR VEHICLE

BACKGROUND AND SUMMARY OF THE INVENTION

This application claims the priority of German Application No. 196 39 673.5, the disclosure of which is expressly incorporated by reference herein.

The invention relates to a display arranged in a motor vehicle.

In the case of currently constructed vehicles, a mirror arranged in a sun visor is generally used as a so-called make-up mirror.

Because of the use of electrochromic glass for reducing the sun radiation into the passenger compartment of a vehicle, a sun visor is no longer required. This also results in the elimination of the make-up mirror unless a special holder is provided for it.

Motor vehicles are known (German Patent documents DE 32 00 294 A1, DE 71 02 936 U1, DE 1246443 B, International Patent Document WO 96/21581 A 1, Japanese Patent Document JP 6-262981 A) in which a display is arranged in the area of the windshield. The situation behind the vehicle is fed into the display as an image which is videod by an external camera arranged on the rearward structure of the vehicle.

In addition, a motor vehicle is known (German Patent document DE 42 38 275 A1) in the case of which a camera is arranged in the area of the rearview mirror. The camera, for preventing criminal offenses, photographs a person entering the vehicle.

Furthermore, videophones are known, for example, from Telekom or AT&T, in the case of which a swivellable display with an integrated camera is arranged in the dialing unit. This display shows the image of an object which is photographed (videod) by a camera on the dialing unit of the speaking partner. In addition, the display may be switched to an intrinsic image control or an image-in-image (picture-in-picture) function.

It is an object of the invention to provide a so-called make-up mirror in a vehicle even when the sun visor with the known make-up mirror is eliminated.

This object is achieved by a display which is arranged in a motor vehicle and in which a camera is integrated such that, for use as a mirror replacement, an object photographed by the camera and situated in front of the display is shown on the display as a mirror image. Advantageous developments and further developments of the invention are described herein.

Other objects, advantages and novel features of the present invention will become apparent from the following detailed description of the invention when considered in conjunction with the accompanying drawing.

BRIEF DESCRIPTION OF THE DRAWING

The single FIGURE is a schematic illustration of an embodiment of the present invention.

DETAILED DESCRIPTION OF THE DRAWING

Referring to the figure, a windshield 3 made of an electrochromic glass is fastened in the receiving devices of a motor vehicle formed of the two A-columns 1 and the roof frame 2. A display 4 is arranged on the roof frame 2 approximately in the center of the vehicle. The display is mounted 4.4 such that it can be swivelled—like a rearview mirror—in the directions indicated by arrows 4.1, 4.2. A camera 5 is integrated in the display 4. The axis 5.1 of the camera 5 and an axis 4.3 extending perpendicularly away from the face of the display 4 extend axially in parallel with one another. This ensures that an object photographed by the camera 5, such as the front passenger's face, is shown on the display as a mirror image without any distortions. In this manner, the display 4 with the camera 5 therefore carries out the function of a make-up mirror.

The display 4 can preferably be swivelled by an external power source such as an actuator 9, in which case the external-power-operated swivelling can be triggered by the use of an operating switch 6. In this case, the external-power operation can take place as in the case of a known, electrically adjustable outside mirror. For a better illumination of the object and/or of the mirror image, lighting devices 7 are arranged in or around the display 4, for example, in the frame of the display 4 or in the roof frame 2 close to the display 4. In order to keep the arrangement of a size which is comparable to that of a known inside mirror or make-up mirror, the display 4 is preferably constructed as a color liquid crystal (LC) display and the camera 5 is of a miniaturized charge coupled device (CCD) type.

The arrangement is particularly significant if the display 4 is used in connection with another external camera 8 which is arranged in the rearward area of the vehicle and takes an image of the situation behind the vehicle and feeds it into the display. When used with the rear external camera 8, the function of a rearview device is additionally provided instead of the known rearview mirror. In this case, the display of the images taken by the cameras 5, 8 can be switched by a switch 6.1; for example, the situation behind the vehicle normally represented on the display 4 is blanked-out when the switch 6.1 is operated and the object photographed by the then activated camera 5 is shown as a mirror image. Such an operating mode is permissible when a second outside mirror is present.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A display which is arranged in a motor vehicle for use as a mirror replacement, wherein a camera is integrated in the display and is oriented to image an object immediately in front of the display so that the object imaged by the camera is shown on the display as a mirror image of the object; and wherein an axis of the camera and an axis extending perpendicularly from a face of the display extend axially in parallel with one another or slightly converging with one another.

2. The display according to claim 1, wherein the display is swivellably arranged on a forward roof frame approximately in a center of the vehicle.

3. The display according to claim 2, wherein the display is swivellable in an external-power-operated manner.

4. The display according to claim 3, wherein the external-power-operated swivelling is triggerable by using an operating switch.

5. The display according to claim 1, wherein illumination devices are arranged in or around the display.

6. The display according to claim 1, wherein the display is constructed as a color LC display.

7. The display according to claim 1, wherein the camera is of a CCD type.

8. The display according to claim 1, wherein the display is constructed in connection with another external camera as a rearview device.

9. The display according to claim 8, wherein representations of images taken by the cameras are switchable on the display.

10. A mirror replacement in a motor vehicle, comprising:
   a display arranged in the motor vehicle;
   a camera integrated in and coupled to the display, said camera being oriented to image an object situated in front of the display and showing the object on the display as a mirror image of the object; and
   wherein an axis of the camera and an axis extending perpendicularly from a face of the display extend at least one of in parallel and slightly converging with respect to one another.

11. The mirror replacement according to claim 10, further comprising a swivellable mount, said display being swivellably arrangeable on a forward roof frame of the vehicle via the swivellable mount.

12. The mirror replacement according to claim 11, further comprising an externally power-operated actuator coupled to said display, said actuator being capable of swivelling said display in an externally power-operated manner.

13. The mirror replacement according to claim 10, further comprising an operating switch coupled to said externally power-operated actuator, said operating switch controlling the swivelling of the display.

14. The mirror replacement according to claim 10, further comprising illumination devices arranged in or around the display.

15. The mirror replacement according to claim 10, wherein said display is a color LC display.

16. The mirror replacement according to claim 10, wherein said camera is a CCD type of camera.

17. The mirror replacement according to claim 10, further comprising a second rear view camera coupled to the display.

18. The mirror replacement according to claim 17, wherein representations of images taken by both the camera and the second rear view camera are switchably viewed on the display.

19. A cosmetic mirror replacement in a motor vehicle, comprising:
   a display arranged in the motor vehicle;
   a camera integrated in and coupled to the display, said camera being oriented to image an object situated in front of the display and showing the object on the display as a mirror image of the object; and
   wherein an axis of the camera and an axis extending perpendicularly from a face of the display extend at least one of in parallel and slightly converging with respect to one another.

\* \* \* \* \*